US012768973B2

United States Patent

Manica et al.

(12) United States Patent
(10) Patent No.: US 12,768,973 B2
(45) Date of Patent: Oct. 20, 2026

(54) PHASE-CODED FREQUENCY MODULATED CONTINUOUS WAVE (FMCW) RADAR SYSTEM METHOD AND ARCHITECTURE

(71) Applicant: Rockwell Collins, Inc., Cedar Rapids, IA (US)

(72) Inventors: Luca Manica, Trento (IT); Carlo L. Tiana, Goldendale, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 488 days.

(21) Appl. No.: 18/108,121

(22) Filed: Feb. 10, 2023

(65) Prior Publication Data

US 2023/0296749 A1 Sep. 21, 2023

(30) Foreign Application Priority Data

Feb. 11, 2022 (EP) .................................... 22156445

(51) Int. Cl.

*G01S 13/32* (2006.01)
*G01S 7/35* (2006.01)
*G01S 13/34* (2006.01)
*G01S 13/933* (2020.01)

(52) U.S. Cl.

CPC ............ *G01S 13/325* (2013.01); *G01S 7/354* (2013.01); *G01S 7/356* (2021.05); *G01S 13/933* (2020.01); *G01S 13/343* (2013.01)

(58) Field of Classification Search

CPC ...... G01S 13/325; G01S 13/933; G01S 7/356; G01S 7/354; G01S 13/343

See application file for complete search history.

(56) References Cited

U.S. PATENT DOCUMENTS

| | | | | |
|---|---|---|---|---|
| 5,305,008 | A * | 4/1994 | Turner | G01S 13/758 342/51 |
| 6,198,781 | B1 * | 3/2001 | Ohno | H04L 27/26524 375/322 |
| 9,841,498 | B1 | 12/2017 | Campbell et al. | |
| 9,864,043 | B2 | 1/2018 | Franceschini et al. | |

(Continued)

FOREIGN PATENT DOCUMENTS

| | | | |
|---|---|---|---|
| CN | 111090075 | A | 5/2020 |
| EP | 3811111 | A1 | 4/2021 |

(Continued)

OTHER PUBLICATIONS

F. Uysal, "Phase-Coded FMCW Automotive Radar: System Design and Interference Mitigation," in IEEE Transactions on Vehicular Technology, vol. 69, No. 1, pp. 270-281, Jan. 2020, doi: 10.1109/TVT.2019.2953305. (Year: 2020).*

(Continued)

*Primary Examiner* — Timothy A Brainard
*Assistant Examiner* — Noah Yi Min Zhu
(74) *Attorney, Agent, or Firm* — Suiter Swantz IP

(57) ABSTRACT

A method of phase-code alignment of one or more phase-coded frequency-modulated continuous wave (PC-FMCW) signals received at a PC-FMCW radar system, is disclosed. The method may include monitoring the amplitude of a phase-coded received signal and whenever a change in the square amplitude of the phase-coded received signal is detected, the signal may be multiplied by a delayed version of the phase code to generate an uncoded signal.

12 Claims, 9 Drawing Sheets

(56) References Cited

U.S. PATENT DOCUMENTS

| | | | | |
|---|---|---|---|---|
| 10,976,425 | B2 | 4/2021 | Beise | |
| 2011/0317782 | A1* | 12/2011 | Vierinen | H04L 1/0056 375/295 |
| 2012/0280850 | A1* | 11/2012 | Robin | G01S 13/782 342/40 |
| 2017/0176573 | A1 | 6/2017 | Lynch | |
| 2019/0383925 | A1 | 12/2019 | Gulati et al. | |
| 2020/0081110 | A1 | 3/2020 | Nam et al. | |
| 2020/0132825 | A1 | 4/2020 | Jungmaier et al. | |
| 2020/0256948 | A1* | 8/2020 | Jansen | G01S 13/34 |
| 2021/0247507 | A1* | 8/2021 | Zheng | G01S 7/35 |

FOREIGN PATENT DOCUMENTS

| | | | |
|---|---|---|---|
| EP | 3827276 | A1 | 6/2021 |
| WO | WO-2020162751 | A1 * | 8/2020 |
| WO | 2021003500 | A1 | 1/2021 |

OTHER PUBLICATIONS

Wikipedia Contributors. "Flight Number." Wikipedia, Wikimedia Foundation, Jan. 20, 2022, https://en.wikipedia.org/w/index.php?title=Flight_number&oldid=1066908855. (Year: 2022).*

Extended European Search Report dated Aug. 25, 2022 for European Application No. 22156445.3.

Faruk Uysal; "Phase-Coded FMCW Automotive Radar: System design and interface mitigation,"; IEEE Trans. on Vehicular Technology, vol. 69, No. 1. pp. 270-281, Jan. 2020.

* cited by examiner

PHASE-CODED FREQUENCY MODULATED CONTINUOUS WAVE (FMCW) RADAR SYSTEM METHOD AND ARCHITECTURE

CROSS-REFERENCE TO RELATED APPLICATIONS

The present application claims the benefit of European Patent Application No. 22156445.3, entitled Phase-Coded FMCW Radar System Architecture for Interference Mitigation in Next-Generation Airborne RF-Imager, filed Feb. 11, 2021, which is incorporated by reference in the entirety.

TECHNICAL FIELD

The present disclosure is concerned with a frequency modulated continuous wave (FMCW) radar system architecture for interference mitigation particularly, but not exclusively, for use in aviation.

BACKGROUND

Radars use radio frequency (RF) spectrum energy to detect objects or targets and find use in many fields including in ships, road vehicles and aircraft. Simply stated, a radar system includes a transmitter that transmits modulated or pulsed signals in the RF range. If the transmitted signal meets an object, it is reflected by the object and detected by a receiver. Based on characteristics of the received signal, the range, size, speed, direction of movement etc. of the object can be determined. In automotive or avionics applications, such radar technology can be used to warn an operator, or to control an automatically operated vehicle/aircraft based on detection of obstacle, scene or the like.

Many types of radar architecture and technology are known and used. Historically, linear frequency modulation (LFM) has been used. Other commonly used systems use simple continuous wave (CW) radars. CW-radars radiate continuous transmission power. Such radars, however, do not include any time information in the received waves and so cannot identify the distance of the object. To overcome such drawbacks, frequency-modulated continuous wave (FMCW) radars have been developed. With FMCW radars, the transmission signal is modulated in frequency—i.e. the frequency of the transmitted signal changes over time. When a return signal is received, the delay in the frequency pattern compared to the transmitted signal can be used as a measure of the distance to the detected object. FMCW radar systems are now commonly used in many applications as they have very small range resolution, can determine the relative speed of a moving object and signal processing is relatively simple. FMCW radars in avionics may be installed on aircraft for assisted landing, cable warning and obstacle avoidance (CWOA) and for sense and avoid (SAA) operation.

A common problem with FMCW radar systems, however, is that they are subject to interference. In aircraft, for example, FMCW radars will all share the same frequency spectrum that is reserved for avionics. Similarly, all road vehicle radars will operate within a given frequency spectrum. A problem, particularly as levels of traffic increase, is that any FMCW radar may be impacted by other FMCW radars operating in close proximity, and with overlapping fields of view, and signals from these other radars can give rise to false target detection or shadow low power radar echoes. This problem is particularly acute in aviation applications, where the relatively long range of transmission and the in-line position of multiple aircraft on an approach path can lead to severe interference among the different radar systems.

Interference can be reduced using available multiplexing techniques such as Time Division Multiple Access (TDMA), whereby different transmitters are allocated different time slots, Frequency Division Multiple Access (FDMA), whereby different transmitters are allocated different frequencies, and Code Division Multiple Access (CDMA), where different transmitters transmit signals including different identifying codes. In applications such as avionics, however, TDMA is not a viable choice since the FMCW radars are not synchronized. FDMA techniques are also not ideal since frequency synchronization between different aircraft is needed and because available frequency spectrum in the aircraft space is a scarce and expensive resource. This limits the number of radars that could transmit using FDMA. Coding of the signals is the remaining technique that can be usefully exploited to mitigate interference and allow co-existence between radars operating in the same space.

Various types of phase-coded or phase modulated radar waveforms are used in some fields. Phase-coded frequency-modulated continuous wave (PC-FMCW) radar is a relatively new technique that has been found useful in retaining the benefits of FMCW radars whilst mitigating interference between multiple radars.

PC-FMCW has started to find application in vehicles, e.g. autonomous vehicles.

The signal to be transmitted is phase modulated to form a coded signal and this modulates a carrier signal to form a transmission signal. A reflected (coded) signal is demodulated with the uncoded transmission signal. The signal can only be reconstructed, for use to perform target range/speed etc. estimation, using the proper phase code, and after signal—code alignment. Any signals received at the radar that are uncoded or do not have the correct code for that radar will appear as noise. A PC-FMCW radar system is disclosed in WO2020/162751 and in F. Uysal, 'Phase-Coded FMCW Automotive Radar: System design and interface mitigation,' IEEE Trans. On Vehicular Technology, vol 69, no. 1. Pp. 270-281, January 2020. (hereinafter 'Uysal').

A problem with the PC-FMCW radar system known from WO2020/162751 and Uysal, for example, is that it uses complex and costly software and hardware to perform the encoding and decoding. Furthermore, the signal-code alignment is performed using a group of delay filters to align the received signals before they enter the decoder. Only when all the received signals have been delayed into alignment can the decoding start. This introduces delays into the response of the radar system that are particularly problematic when affecting airborne radars, potentially even with negative impact on safety. The solutions proposed by Uysal are complex solutions that require some operation to be performed to align the signals before a Fast Fourier Transform (FFT) operation to decode the signals. Furthermore, no information about the interfering signals can be obtained.

There is, therefore, a need for a simpler and faster PC-FMCW radar system from which information about the interfering signals can be obtained.

SUMMARY

According to one aspect, there is provided a method of phase-code alignment of phase coded frequency modulated signals received at a PC-FMCW radar system, the method comprising monitoring the amplitude of a phase-coded received signal and whenever a change in the square amplitude of the phase-coded received signal is detected, the signal is multiplied by a delayed version of the phase code to generate an uncoded signal.

Also provided is a method of detecting an object with a PC-FMCW radar system, the method comprising: generating an initial signal in a synthesizer; phase-coding the initial signal in an encoder to provide a coded signal; generating a transmission signal by modulating a carrier signal with the coded signal; transmitting the coded signal; receiving a reflected signal resulting from the transmitted signal reflecting off the object; decoding the reflected signal; and determining a range of the object from the decoded signal; wherein the step of decoding the reflected signal includes performing phase-code alignment of the reflected signal according to the above method.

Corresponding systems are also provided.

BRIEF DESCRIPTION

Examples of the radar system according to this disclosure will now be described in more detail with reference to the drawings. It should be noted, that these are examples only, and that variations are possible within the scope of the claims.

Figures 5A, 5B, 5C, 5D:
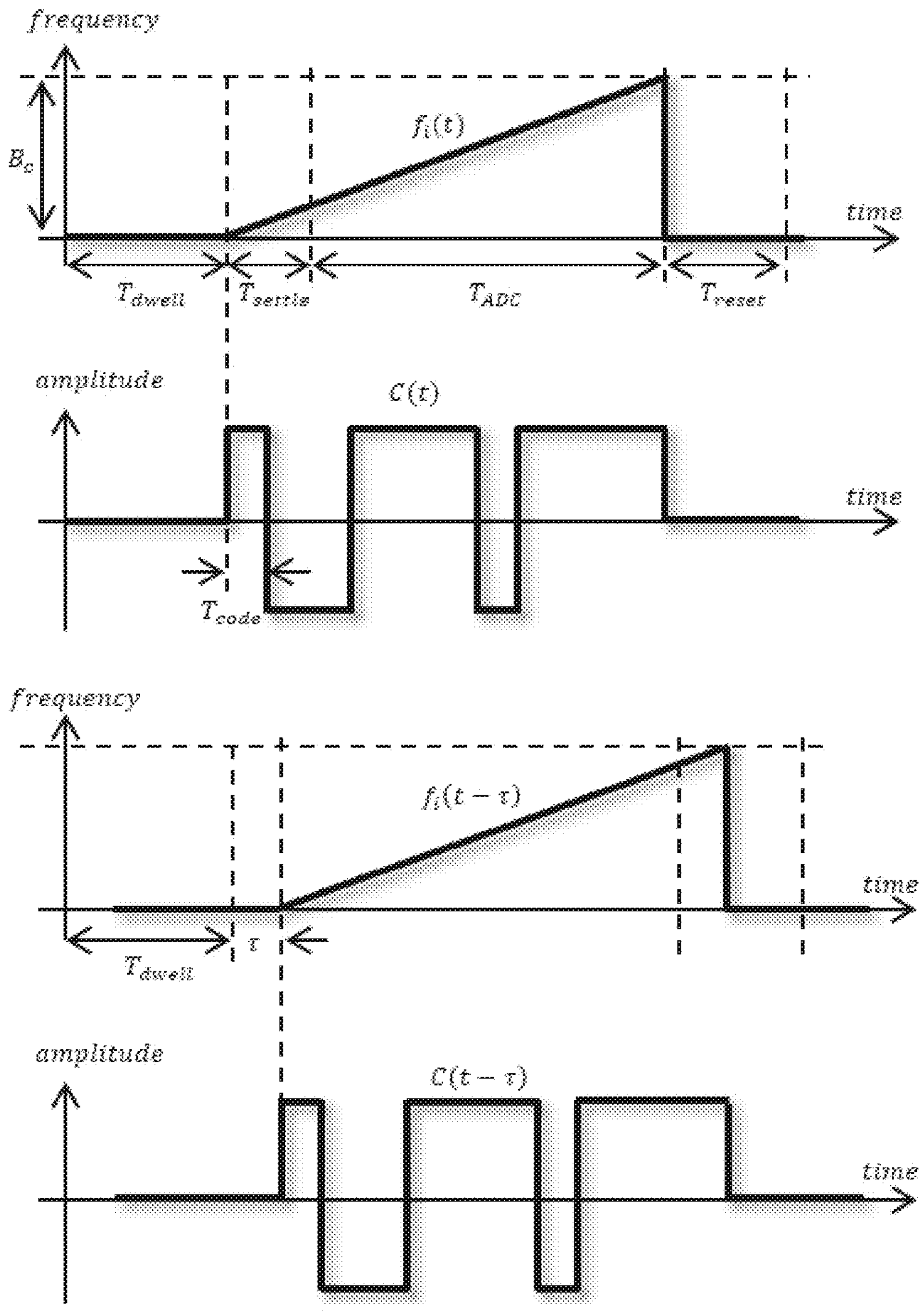

FIGS. 5(*a*) to 5(*d*) illustrate code misalignment in received PC-FMCW signals.

Figure 6A:
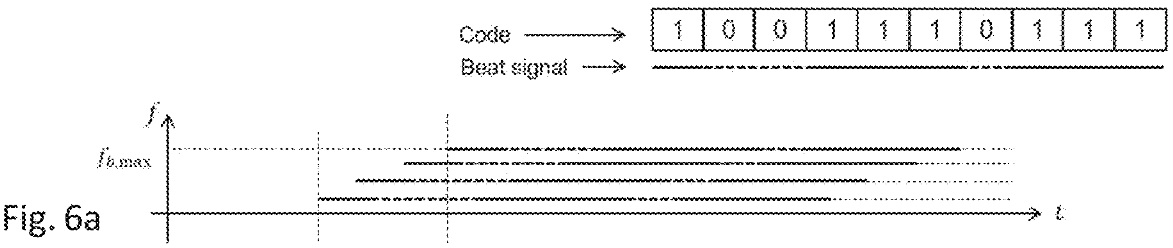
Figure 6B:
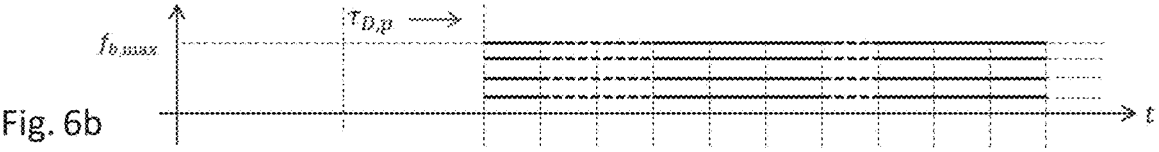
Figure 6C:
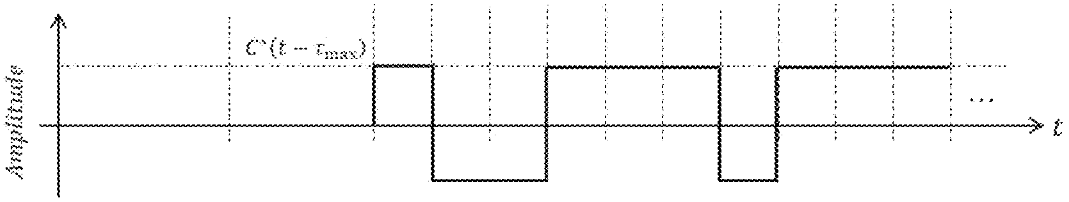

FIGS. 6(*a*) to 6(*c*) illustrate a known way of phase code alignment.

Figure 7:
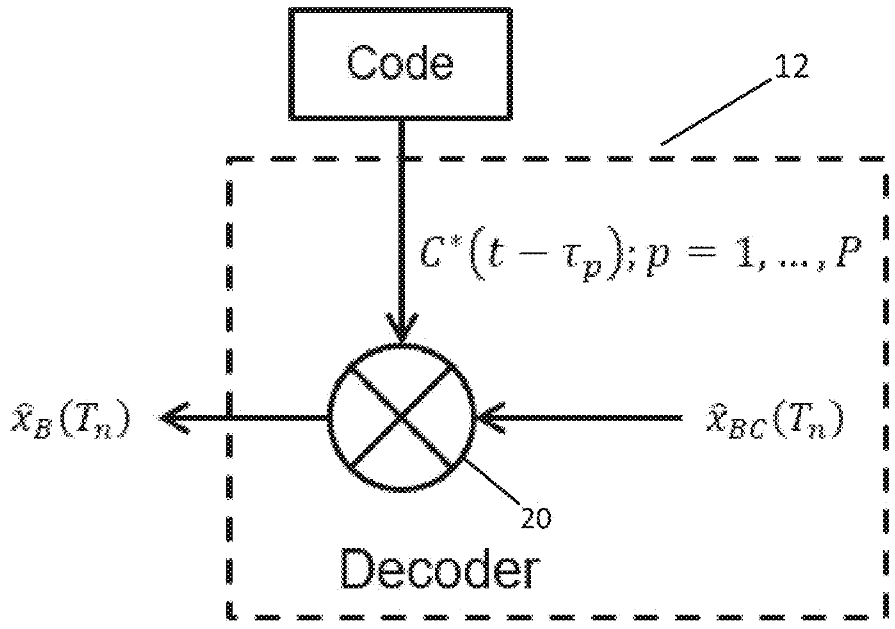

FIG. 7 shows a decoder for use with a system according to the disclosure.

Figure 8:
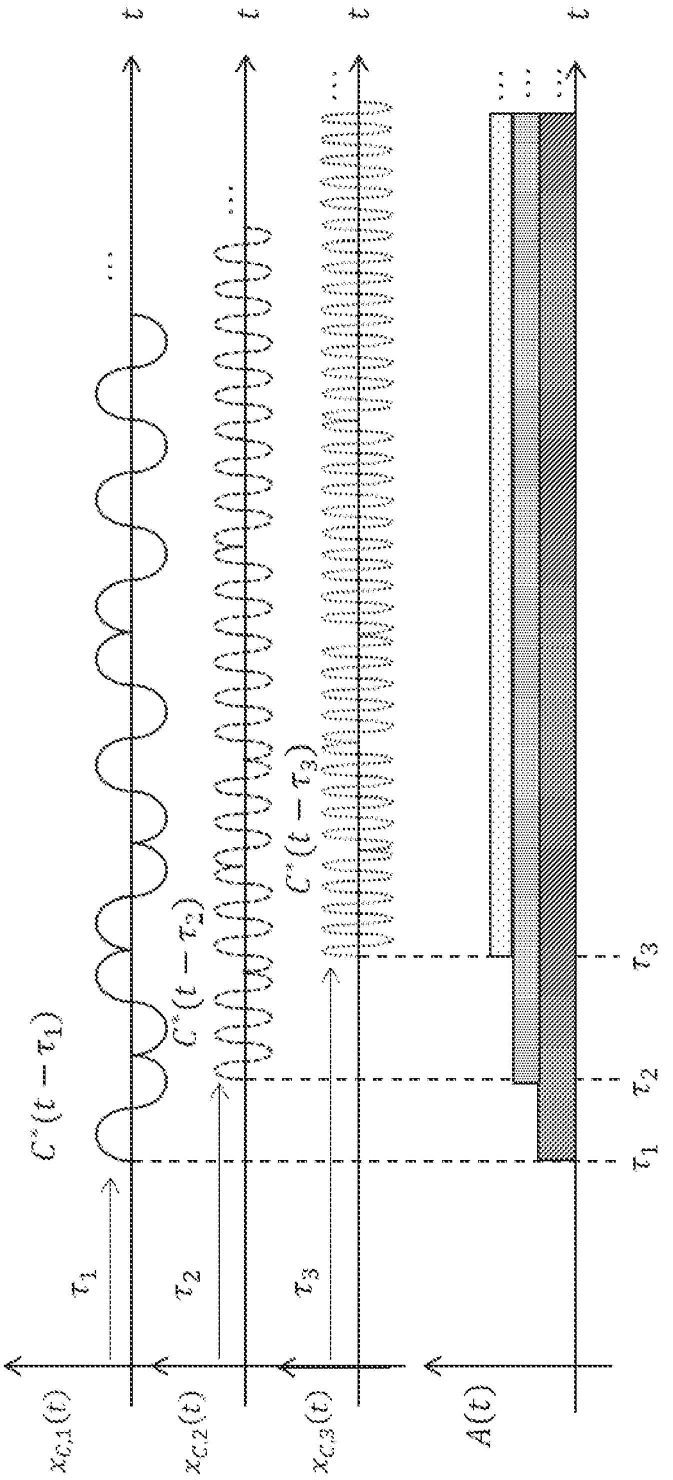

FIG. 8 is shown to explain the principle of phase code alignment according to the disclosure.

Figure 9:
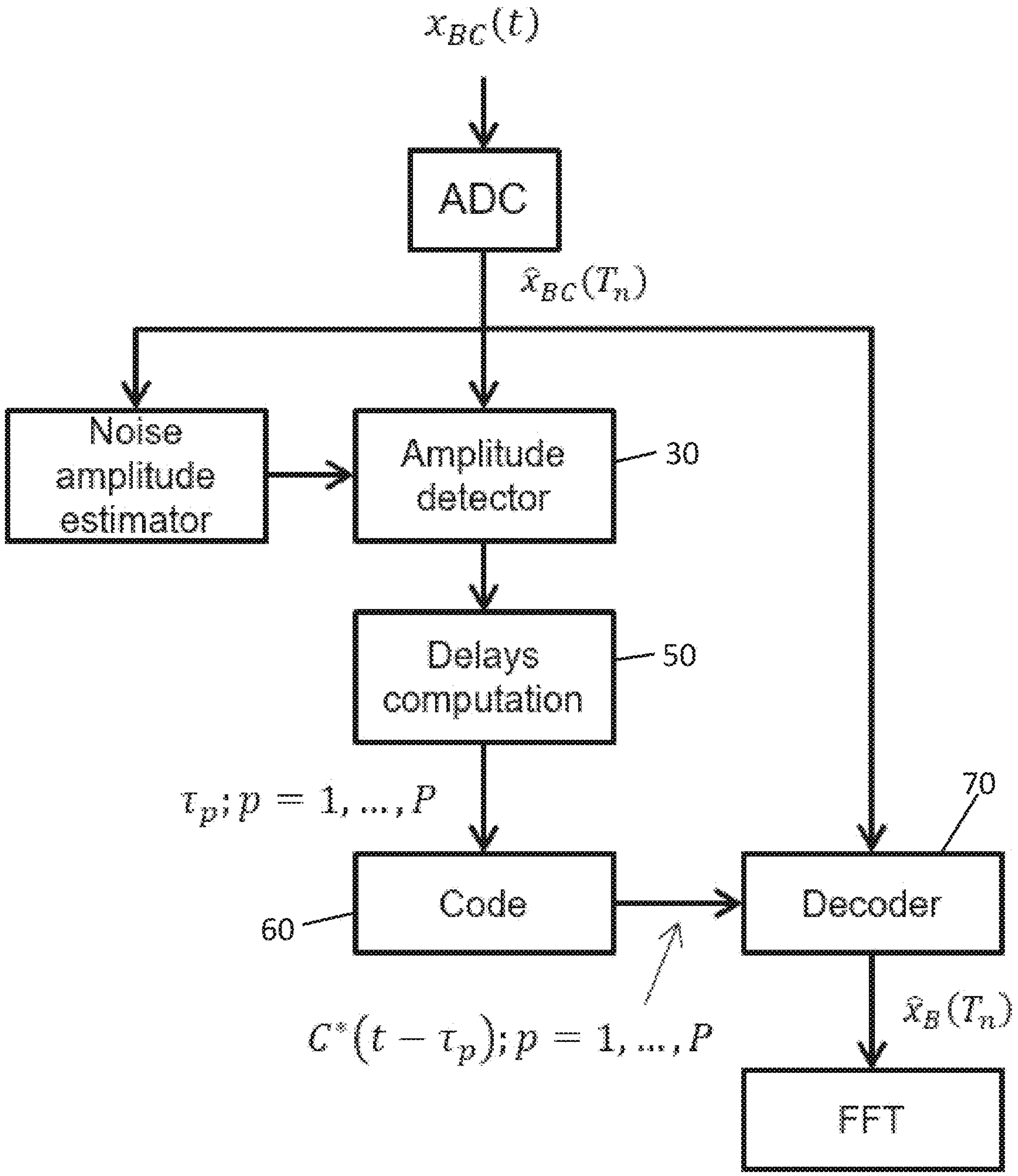

FIG. 9 shows operation of decoding according to the disclosure.

DETAILED DESCRIPTION

Figure 1:
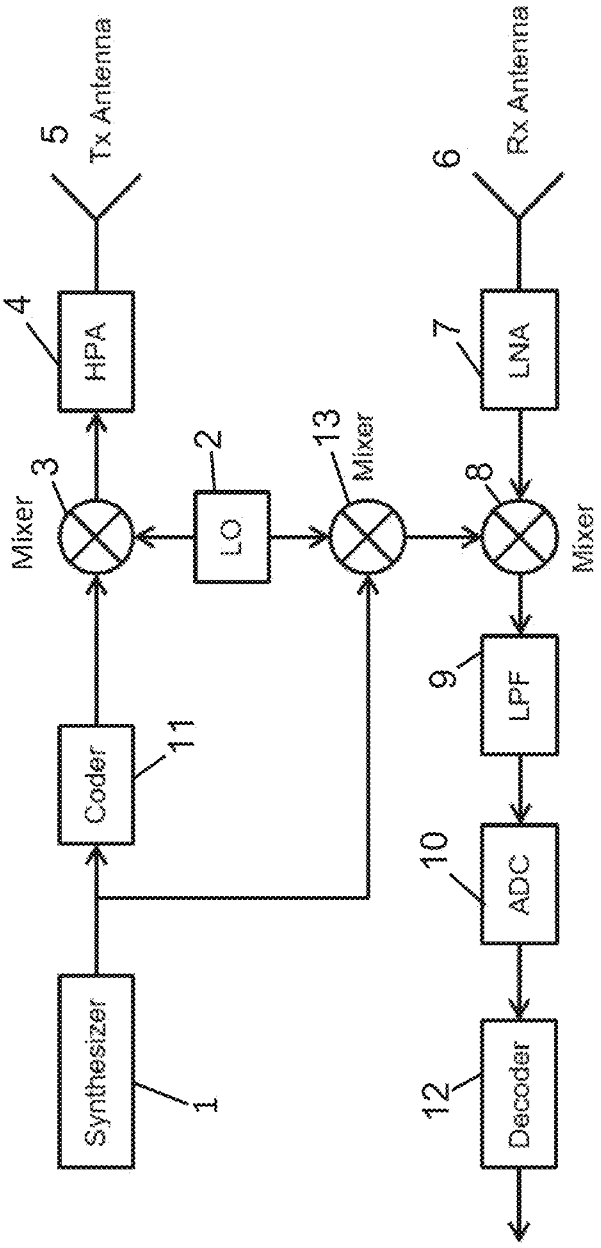
FIG. 1 shows a schematic PC-FMCW radar architecture.

The general concept of PC-FMCW radars will first be described, with reference to FIG. 1.

The typical FMCW radar architecture comprises a signal synthesizer 1 to generate a continuous wave signal which is frequency modulated using a local oscillator 2 and a first mixer 3. The frequency of the transmit signal increases over time. The FM signal is amplified by a high power amplifier 4 and transmitted by a transmitter antenna 5. The transmitted signal, called chirp, is described mathematically as:

$$x_T(t) = A(t)\cdot \mathrm{rect}\left(\frac{t - T_c/2}{T_c}\right)\cos(\phi(t)) \tag{1}$$

where A(t) is the envelope of the transmitted signal, ϕ(t) is the phase of the signal and rect(.) indicates a unitary pulse centred in $T_c/2$ with width $T_c$, where $T_c$ represents the duration of the chirp.

Since the chirp frequency increase linearly with time, the phase ϕ(t) is.

$$\phi(t) = 2\pi\int_0^t f(t)dt = 2\pi\left(f_c t + \frac{1}{2}kt^2\right) + \phi_0 \tag{2}$$

$f_c$ being the starting frequency of the chirp and $k=B_c/T_c$ being the chirp slope, i.e., the ratio between the chirp bandwidth $B_c$ and the chirp duration $T_c$.

When the transmitted signal meets an object in range of the radar, the signal is reflected or echoed by the object and detected at a receiver antenna 6 of the radar system. The received signal is amplified, here by a low noise amplifier 7. The received signal, after de-chirping, which is the beat signal, is represented as:

$$x_B(t) = \frac{A(t)A(t-\tau)}{2}\cdot \mathrm{rect}\left(\frac{t-\tau-T_c/2}{T_c}\right)\cdot\cos(\phi(t)-\phi(t-\tau)) \tag{3}$$

τ being the echo delay, that depends by the target range r and by the target speed v as:

$$\tau = \frac{2(r+vt)}{c_0} \tag{4}$$

To determine the distance of the object, the received signal is compared with the original signal at mixer 8 and the beat signal is then filtered by low pass filter 9 to eliminate high frequency components and is sampled by analog-to-digital converter (ADC) 10. The digitized beat signal can then be processed to analyse the object.

The reflected signals will each be received with a respective time delay with respect to the transmitted chirp. The beat signals can then undergo a FFT to provide a beat signal spectrum showing power versus frequency for each received beat signal and the range is proportional to the frequency.

As mentioned above, FMCW is subject to interference where radars are operating close to each other. This can lead to false target detection and also increased noise.

To address this problem, phase-coded FMCW (PC-FMCW) systems were developed, adding a coder 11 and decoder 12 to the typical FMCW architecture to allow radars to identify their own signals. Phase coding performs a spreading of the transmitted signal and a received signal can only be reconstructed using the proper phase code. Uncoded or differently coded signals at the receiver will appear as noise.

Coding techniques will be described further below, but in simple terms, the generated signal from the synthesizer 1 is encoded at the coder 11. The encoded signal is then mixed with the local oscillator 2 signal at the first mixer 3, is amplified and transmitted as described above.

The received signal is decoded in that it is mixed at second mixer 8 with the uncoded transmit signal, via a further mixer 13 which preserves the original phase coding for each beat frequency after dechirping.

Because of the propagation time of the reflected signal, the signal envelopes of the transmitted signal and the received signal will not match and so the codes are not aligned. It is not, therefore, possible to successfully decode the signal unless some processing occurs to align the signals and codes. Again, this will be discussed further below.

Figure 2:
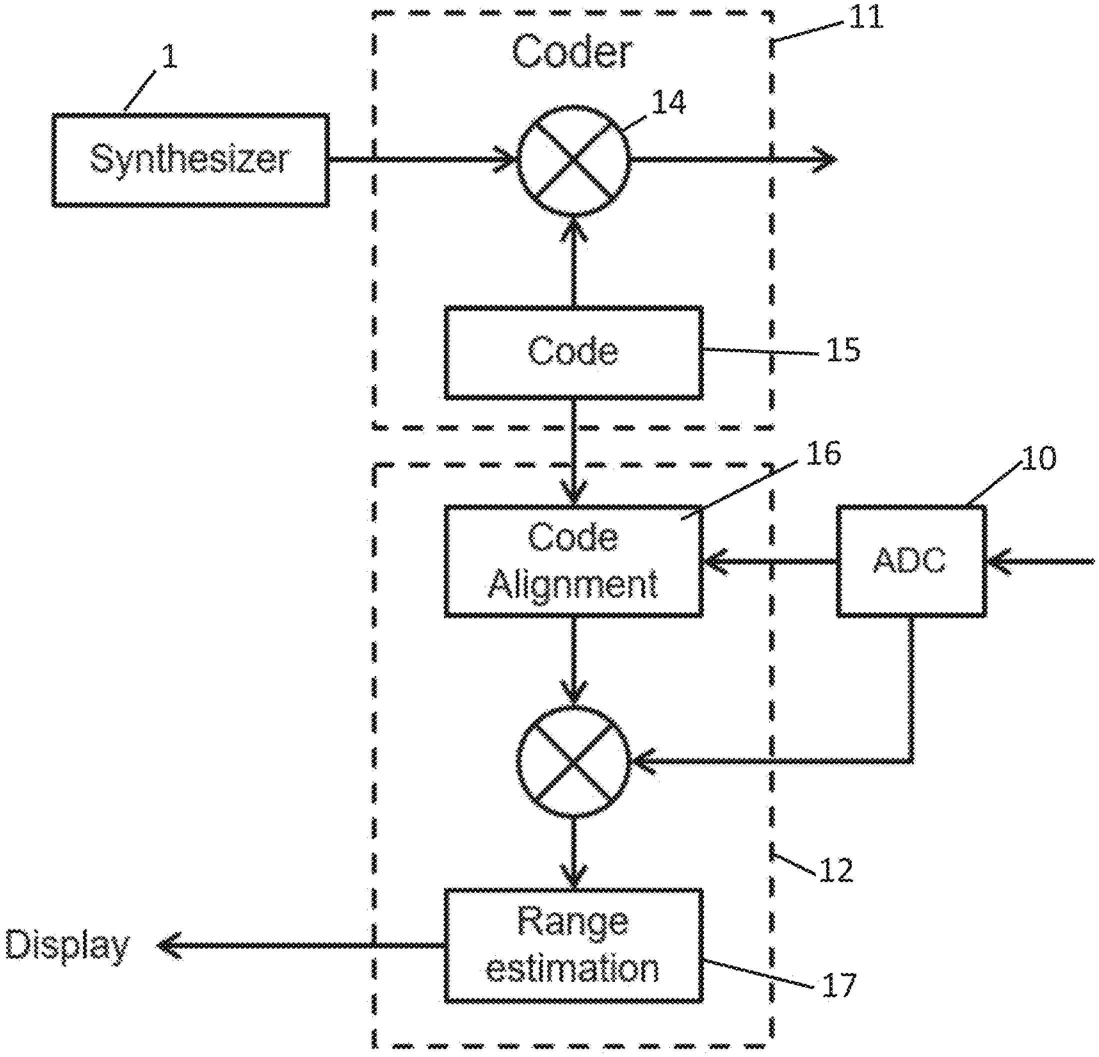
FIG. 2 shows, schematically, the coder and decoder of FIG. 1.

Returning to the coder 11, and with reference to FIG. 2, the coder 11 multiplies 14 the synthesizer output (the 'chirp') with a phase code 15. The phase code has the same duration as the chirp and should be selected to have good auto-correlation properties, e.g. a Kasami code.

At the decoder 12, the phase-code is aligned 16 with the acquired signal and is then decoded based on the digitised received signal to perform target range and/or speed estimation 17. The results may be displayed on a monitor or other imager (not shown).

Describing the phase coding now in more detail, a phase coded waveform divides the chirp into a number $L_c$ of time segments or code parts of duration $T_{code}$, where $L_c$ defines the length of the code.

The encoding of the transmit signal represented as above, for a single period $T_c$ provides a phase-coded waveform represented as:

$$x_{TC}(t) = C(t)\cdot \text{rect}\left(\frac{t - T_c/2}{T_c}\right)\cos(\phi(t)) \quad (5)$$

C(t) being a phase code of length $L_c$, defined as:

$$C(t) = \sum_{n=1}^{L_c} e^{j\phi_n}\text{rect}\left(\frac{t-(n-1/2)T_{code}}{T_{code}}\right) \quad (6)$$

where $\phi_n=\phi(n) \in [0, 2\pi]$; n=1, . . . , $L_c$ is the code phase sequence and $T_{code}$ the time duration of an element of the sequence. For a binary-code, $\phi_n=\{0, \pi\}$ so the code sequence can assume only the values 1 and −1, which cause changes in the phase of the signal every $T_{code}$ time. As the code changes, phase discontinuities occur.

Figure 3:
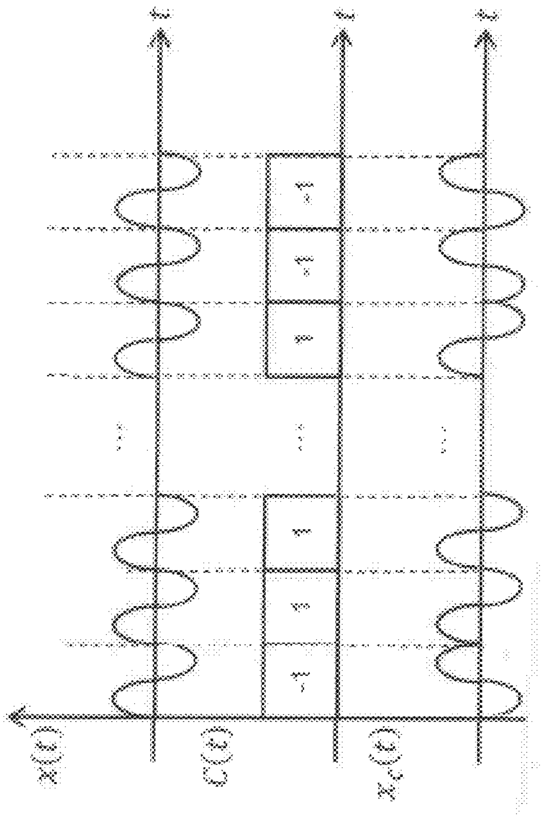
FIG. 3 shows an example of phase coding.
Figure 4:
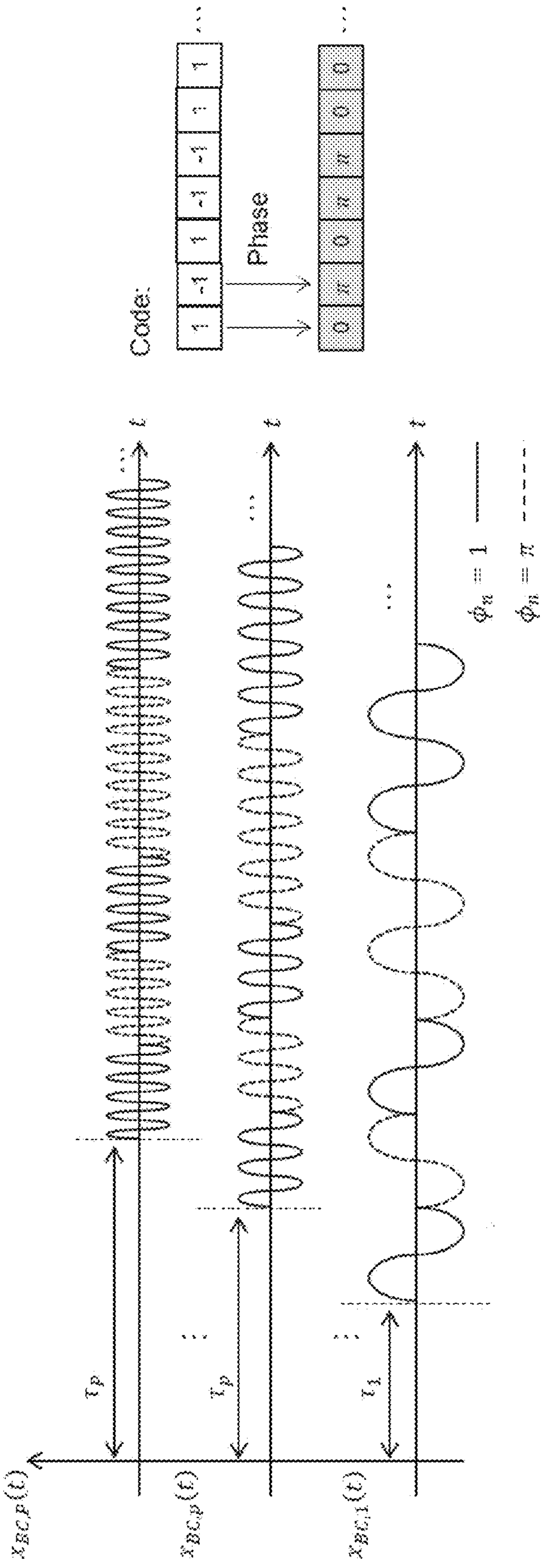
FIG. 4 shows an example of PC-FMCW received signals.

This is represented in FIG. 3 where x(t) is the initial signal, C(t) is the code applied to the signal and $x_c(t)$ shows the phase encoded signal where phase shifts can be seen when the code changes between −1 and 1. FIG. 4 shows three different phase coded FMCW received signals. Each signal has a different frequency but is encoded with the same code.

If the waveform is encoded using a bipolar phase code—i.e. where the codes are −1 and +1, then the envelope of the transmitted signal A(t)=C(t) and the envelope of the received signal B(t)=C(t−τ). Therefore, the beat signal after dechirping at a low-pass filter can be represented as:

$$x_{BC}(t) = \frac{C(t)C(t-\tau)}{2}\cdot\text{rect}\left(\frac{t-\tau-T_c/2}{T_c}\right)\cdot\cos(\phi(t)-\phi(t-\tau)) \quad (7)$$

There is, therefore, a delay between the transmitted signal envelope and the received signal envelope. The code misalignment is shown, by way of example, in FIGS. 5(*a*) to 5 (*d*) where FIG. 5(*a*) shows the transmitted signal and FIG. 5(*b*) shows the encoded transmitted signal along a time line. FIGS. 5(*c*) and 5(*d*), respectively, show the received signal and received encoded signal and the misalignment in the codes.

These envelopes need to be aligned if the received signal is to be decoded.

Uysal (referred to above) uses a time domain group delay filter, implemented either in hardware or software, to align the envelopes of each beat frequency. The approach used by Uysal is described with reference to FIGS. 6(*a*) to 6 (*c*). The received signals at each frequency are each received at a different time as shown in FIG. 6(*a*). The group delay filter determines, after receipt of the latest signal, the delay between each signal and applies a filter function to each signal to align them in time as shown in FIG. 6(*b*). Each beat signal is delayed proportionally to its frequency as:

$$\tau_D = \frac{1}{k}(f_{b,max} - f_b) \quad (8)$$

where $f_b$ is the frequency of the beat signal computed as:

$$f_b = \frac{2r}{c_0}k \quad (9)$$

$f_{b,max}$ is the maximal detectable frequency:

$$f_b = \frac{2r_{max}}{c_0}k \quad (10)$$

being $k=B_c/T_c$ the sweep slope.

In other words, each beat signal is delayed proportionally to its frequency. Because this process needs to wait until the last beat signal has been received before it can determine the delay, processing is not in real time and information about closer targets is delayed to some extent. Both the hardware and software implementation of the group delay filtering increases the complexity of the radar system since additional processing needs to be added before the FFT operation and very high order filters are required. Furthermore, the signals do not provide any information about any interfering system.

The solution of the present disclosure provides a new way of phase-code alignment without the use of group delay filters.

According to the present disclosure, the decoder operates using an algorithm implemented in software. The algorithm operates by using the energy of the received signal to trigger the decoding envelope alignment. Thus, as soon as the first beat signal arrives at the receiver, decoding can begin.

When the first beat signal is received, it is sampled by the ADC and the coding is aligned with the received signal (rather than, as in the prior art, the waveforms all being aligned to a code).

The phase decoding involves multiplying the coded signal by the complex conjugate of the code as represented below:

$$c_n\cdot c_n^* = \left[e^{j\phi_n}\cdot\text{rect}\left(\frac{t-(n-1/2)T_{code}}{T_{code}}\right)\right]\cdot \left[e^{-j\phi_n}\cdot\text{rect}\left(\frac{t-(n-1/2)T_{code}}{T_{code}}\right)\right] \quad (11)$$

Now, Equation (11) is equal to 1 because $e^{-j\phi_n}\cdot e^{j\phi_n}=1$ and $\text{rect}^2(.)=1$ since a rectangular function has unitary amplitude. Accordingly, multiplying the code by its complex conjugate restores the original signal.

As shown in FIG. 7, in the decoder 12, the code and the beat signal are applied to a decoder mixer 20 to provide the decoded beat signal.

The phase code alignment according to the disclosure uses an amplitude detector to trigger the alignment and decoding.

FIG. 8 shows the principle of the alignment process. Similar to what is shown in FIG. 4, three phase-coded FMCW signals are received at the receiver, each delayed in time. The first beat signal $x_{c,1}(t)$ is received at time $\tau_1$ which represents a first time delay with respect to the transmit signal. The first signal is at a first frequency. The second signal, at a second frequency arrives at a later time $\tau_2$, and the third signal, at a third frequency, arrives at a later time $\tau_3$. The square amplitude of the received signals—shown on line A(t) is used to trigger the decoding procedure.

As described further with reference to FIG. 9, the beat signal is analysed by an amplitude detector 30. An estimate of noise amplitude 40 may also be taken into account when detecting the signal amplitude. Based on the detected amplitude delays for the code are computed 50. Whenever a change in the square amplitude is detected, the signal is multiplied by a delayed version of the code 60 to generate a delay coded signal which is then decoded 70. This is represented mathematically as follows:

$$\left[\sum_{p=1}^{P} \beta_p \cos(2\pi f_p t - \tau_p) \cdot C(t-\tau_p) \cdot \mathrm{rect}\left(\frac{t - T_c/2}{T_c}\right)\right] \times \left[\sum_{p=1}^{P} C^*(t-\tau_q) \cdot \mathrm{rect}\left(\frac{t - T_c/2}{T_c}\right)\right] \quad (12)$$

Now, defining $\cos(2\pi f_p t - \tau_p) = x_p(f_p, \tau_p)$ and applying the decoding procedure, Equation (12) results to be the sum of two terms:

$$\sum_{p=1}^{P} \beta_p \cdot x_p(f_p, \tau_p) \quad (13a)$$

$$\prod_{\substack{p,q=1 \\ p\neq q}}^{P} x_p(f_p, \tau_p) \cdot C(t-\tau_p) \cdot C^*(t-\tau_q) \quad (13b)$$

The first term describes the decoded signals (code is aligned), the second term includes both the multiplication between shifted versions of the same code as well as multiplication of the complex-conjugate of the code with other codes (i.e., the phase-coded interference). It follows the term in (13*b*) shall be minimized to reduce the impact of the interference as well as the noise produced by not-synchronized code. This can be done with codes with good auto-correlation proprieties, such as selected sequences of Hadamard-Welsh code, Zadoff-Chu code, Kasami or Gold codes.

The solution according to the disclosure can be fully implemented in software and does not require additional hardware and is, therefore, less costly and less complex.

Whilst the system according to the disclosure may provide advantages in many fields where radars are used, and particularly in fields where FMCW radars are used but which can be adversely affected by interference from other radars, the solution of this disclosure is believed to have particular advantages in radars used in a wide range of airborne platforms e.g. fixed-wing aircraft, helicopters, unmanned platforms etc. In addition to the phase coding allowing each aircraft to identify its own radar signals, and not to falsely detect signals from other aircraft as target detection signals, it is also envisaged that phase coding could be implemented by airlines or groups of aircraft being allocated their own specific and reserved code set. In this way, it is envisaged that, for example, an aircraft belonging to a given set or group can provide information e.g. weather information to aircraft in its own group. Decoding could happen in the aircraft but could also take place offline by a controller common to the group.

The invention claimed is:

1. A method of phase-code alignment, the method comprising:

receiving one or more phase-coded frequency modulated continuous wave (PC-FMCW) signals from a PC-FMCW radar system;

receiving a first beat signal based on a first received signal of the one or more PC-FMCW signals received;

upon receiving the first beat signal, sampling the first beat signal using an analog-to-digital converter;

monitoring an amplitude of the first beat signal in real-time using an amplitude detector; and upon detecting a change in a square amplitude of the first beat signal using the amplitude detector, wherein the square amplitude is based on a squared function of the amplitude of the first beat signal multiplying the first beat signal by a delayed version of a phase code, using a decoder, to generate an uncoded signal in real-time upon receiving the first beat signal.

2. The method of claim 1, further comprising:

detecting a first change in the square amplitude of the first received signal having a first frequency at a first time delay with respect to a transmitted signal, and multiplying the first signal by the delayed version of the phase code, and wherein subsequent changes in the square amplitude represent receipt of subsequent received signals having respective subsequent time delays with respect to the transmitted signal and subsequent frequencies.

3. The method of claim 1, wherein the multiplication of the one or more PC-FMCW received signals by the delayed version of the phase code is according to the equation:

$$\left[\sum\nolimits_{p=1}^{P} \beta_p \cos(2\pi f_p t - \tau_p) \cdot C(t-\tau_p) \cdot \mathrm{rect}\left(\frac{t - T_c/2}{T_c}\right)\right] \times \left[\sum\nolimits_{q=1}^{P} C^*(t-\tau_q) \cdot \mathrm{rect}\left(\frac{t - T_c/2}{T_c}\right)\right].$$

4. The method of claim 1, wherein the phase code is at least one of a Hadamard-Welsch code type, a Zadoff-Chu code type, a Kasami code type, or a Gold code type.

5. A method of detecting an object with a phase-coded frequency-modulated continuous wave (PC-FMCW) radar system, the method comprising:

generating an initial signal in a synthesizer;

phase-coding the initial signal in an encoder to provide a coded signal;

generating a transmission signal by modulating a carrier signal with the coded signal;

transmitting the coded signal;

receiving a reflected signal resulting from the transmitted signal reflecting off an object;

receiving a first beat signal based on the reflected signal received;

monitoring an amplitude of the first beat signal in real-time using an amplitude detector;

upon receiving the first beat signal and detecting a change in a square amplitude of the first beat signal, decoding the reflected signal in real-time; and determining a range of the object from the decoded signal;

wherein the step of decoding the reflected signal further comprises performing phase-code alignment of the reflected signal.

6. The method of claim 5, wherein the PC-FMCW radar system comprises an aircraft radar system.

7. The method of claim 6, wherein the coded signal is selected to identify a particular aircraft.

8. The method of claim 6, wherein the coded signal is selected to identify a particular airline.

9. A phase-coded frequency-modulated continuous wave (PC-FMCW) radar system comprising:

a synthesizer for generating an initial signal;

an encoder for phase-coding the initial signal to generate a phase-coded signal;

a local oscillator configured for modulating the phase-coded signal to provide a PC-FMCW signal;

a transmitter antenna configured for transmitting the PC-FMCW signal as a transmitted signal;

a receiver for receiving a reflected phase-coded signal resulting from the transmitted signal reflecting from an object;

a system configured for aligning a phase code of the reflected phase-coded signal to generate code-aligned signals, wherein the system comprises an amplitude detector, wherein the amplitude detector triggers a decoder, in real-time, to decode the code-aligned signals to generate decoded signals, in real-time, upon receipt of a first beat signal being received based on the reflected phase-coded signal received via the receiver; and a decoder for decoding the code-aligned signals, wherein the decoded signals are analyzed in real-time to determine a range of the object.

10. The system of claim 9, where decoded signals are analyzed based on a Fast Fourier Transform, FFT, of the decoded signals.

11. The system of claim 9, wherein the system comprises an aircraft radar system.

12. The system of claim 9, wherein the decoder operates using an algorithm implemented in software.

* * * * *